US006347310B1

(12) United States Patent
Passera

(10) Patent No.: US 6,347,310 B1
(45) Date of Patent: Feb. 12, 2002

(54) COMPUTER SYSTEM AND PROCESS FOR TRAINING OF ANALYTICAL MODELS USING LARGE DATA SETS

(75) Inventor: Anthony Passera, Watertown, MA (US)

(73) Assignee: Torrent Systems, Inc., Cambridge, MA (US)

( * ) Notice: Subject to any disclaimer, the term of this patent is extended or adjusted under 35 U.S.C. 154(b) by 0 days.

(21) Appl. No.: 09/075,730

(22) Filed: May 11, 1998

(51) Int. Cl.⁷ ............................................... G06F 15/18

(52) U.S. Cl. .............................. 706/25; 706/16; 706/20

(58) Field of Search ............................... 706/25, 16, 20

(56) References Cited

U.S. PATENT DOCUMENTS

| | | | | |
|---|---|---|---|---|
| 5,627,942 A | * | 5/1997 | Nightingale et al. | 706/25 |
| 5,649,023 A | * | 7/1997 | Barbara et al. | 382/159 |
| 5,774,868 A | * | 6/1998 | Cragun et al. | 705/10 |
| 5,809,490 A | * | 9/1998 | Guiver et al. | 706/16 |
| 5,826,249 A | * | 10/1998 | Sheirik | 706/25 |
| 5,909,681 A | * | 6/1999 | Passera et al. | 707/8 |
| 6,018,728 A | * | 1/2000 | Spence et al. | 706/20 |

OTHER PUBLICATIONS

Hara et al, "A Training Data Selection in online Training for Multilayer Neural Networks". IEEE International Joint Conference On Neural Networks, May 4–9, 1998.*
Wasserman, Philip, "Advanced Methods in Neural Computing", 1993.*
Graupe et al, "Artificial Neural Network Control of FES in Paraplegics for Patient Resposive Ambulation", IEEE Transactions on Biomedical Engineering, Jul. 1995.*
Omlin et al, "Pruning Recurrent Neural Networks for Improved Generalization Performance", Proceedings of the 1994 IEEE Workshop on Neural Networks for Signal Processings, Sep. 1994.*
Doulamis et al, "Retrainable Neural Networks for Image Analysis and Classification", IEEE Inter. Conf. on Systems, Man, and Cybernetics, Oct. 1997.*

* cited by examiner

Primary Examiner—George B. Davis
(74) Attorney, Agent, or Firm—Wolf, Greenfield & Sacks, P.C.

(57) ABSTRACT

A database often contains sparse, i.e., under-represented, conditions which might be not represented in a training data set for training an analytical model if the training data set is created by stratified sampling. Sparse conditions may be represented in a training set by using a data set which includes essentially all of the data in a database, without stratified sampling. A series of samples, or "windows," are used to select portions of the large data set for phases of training. In general, the first window of data should be a reasonably broad sample of the data. After the model is initially trained using a first window of data, subsequent windows are used to retrain the model. For some model types, the model is modified in order to provide it with some retention of training obtained using previous windows of data. Neural networks and Kohonen networks may be used without modification. Models such as probabilistic neural networks, generalized regression neural networks, Gaussian radial basis functions, decision trees, including K-D trees and neural trees, are modified to provide them with properties of memory to retain the effects of training with previous training data sets. Such a modification may be provided using clustering. is Parallel training models which partition the training data set into disjoint subsets are modified so that the partitioner is trained only on the first window of data, whereas subsequent windows are used to train the models to which the partitioner applies the data in parallel.

16 Claims, 5 Drawing Sheets

COMPUTER SYSTEM AND PROCESS FOR TRAINING OF ANALYTICAL MODELS USING LARGE DATA SETS

BACKGROUND

Mathematical and analytical models may be used to recognize hidden predictive patterns in a data set. The kinds of problems for which a model may be used include clustering, classification, estimation and association of data in the data set. There are several types of models that are commonly used, such as probabilistic radial functions (such as probabilistic neural networks, generalized regression neural networks and Gaussian radial basis functions), decision trees (such as K-D trees and neural trees), neural networks, Kohonen networks and other associative algorithms.

Each datum in a data set generally is defined by a vector of one or more input fields and of one or more output fields. Given a kind of problem and a kind of model, input fields that affect the solution to the defined problem are identified and standardized. Any target output fields also are identified and standardized. A training data set to be used to generate or train the model then is prepared. The training data set is typically a subset of a database or large data set. The training data set generally is created using stratified sampling of a large data set. For example, a large customer database containing over several million records may be sampled to create a training set of approximately several thousand entries that generally represents the overall customer base.

SUMMARY

A database often contains sparse, i.e., under-represented, conditions which might be not represented in a training data set if the training data set is created by stratified sampling. A model trained using such a stratified sample ultimately would not represent the sparse conditions. The sparse conditions may be important conditions for the model, especially if the model is intended to evaluate risks, such as credit risk or fraud.

Sparse conditions may be represented in a training set by using a data set which includes essentially all of the data in a database, without stratified sampling. A series of samples, or "windows," are used to select portions of the large data set for phases of training. In general, the first window of data should be a reasonably broad sample of the data. After the model is initially trained using a first window of data, subsequent windows are used to retrain the model. For some model types, the model is modified in order to provide it with some retention of training obtained using previous windows of data. Neural networks and Kohonen networks may be used without modification. Models such as probabilistic neural networks, generalized regression neural networks, Gaussian radial basis functions, decision trees, including K-D trees and neural trees, are modified to provide them with properties of memory to retain the effects of training with previous training data sets. Such a modification may be provided using clustering. Parallel training models which partition the training data set into disjoint subsets are modified so that the partitioner is trained only on the first window of data, whereas subsequent windows are used to train the models to which the partitioner applies the data in parallel.

An advantage of this method of training a model using a large training data set is that the first window of data essentially completely trains the model. Subsequent windows of data are less likely to modify the model if the first window is a substantially broad sample of the entire data set. Time for additional training is incurred primarily due to sparse conditions in the data set, which are precisely those conditions which training with a large data set is intended to capture. If some of these sparse conditions are identified prior to training, data representing these sparse conditions may be re-introduced several times into the training process to ensure that the model represents these conditions.

DETAILED DESCRIPTION

The following detailed description should be read in conjunction with the attached drawing in which similar reference numbers indicate similar structures. All references cited herein are hereby expressly incorporated by reference.

Figure 1:
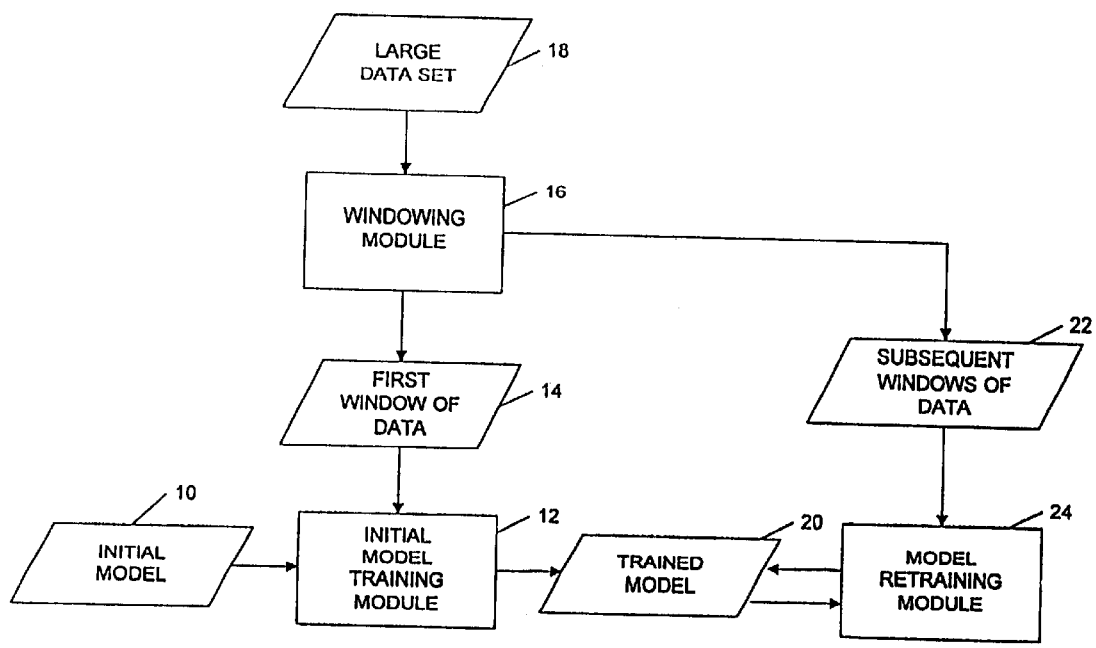
FIG. 1 is a block diagram illustrating the data flow of a process for training a model.

FIG. 1 is a data flow diagram illustrating one embodiment for training a model using a large data set. In this embodiment, an initial model 10 is trained by an initial model training module 12 using a first window, or subset, of data 14. A windowing module 16 reads data from a large data set 18 to provide this first window of data 14 to the initial model training module 12. The initial model training module 12 outputs a trained model 20. Subsequent windows of data 22 from the windowing module 16 are received by a model retraining module 24 which retrains the trained model 20 by updating or adjusting the trained model 20 according to the subsequent windows of data 22. The selected window size generally is about the size of the host memory available for storing the training data set. This available memory size typically is significantly smaller than the size of the large data set.

Figure 2:
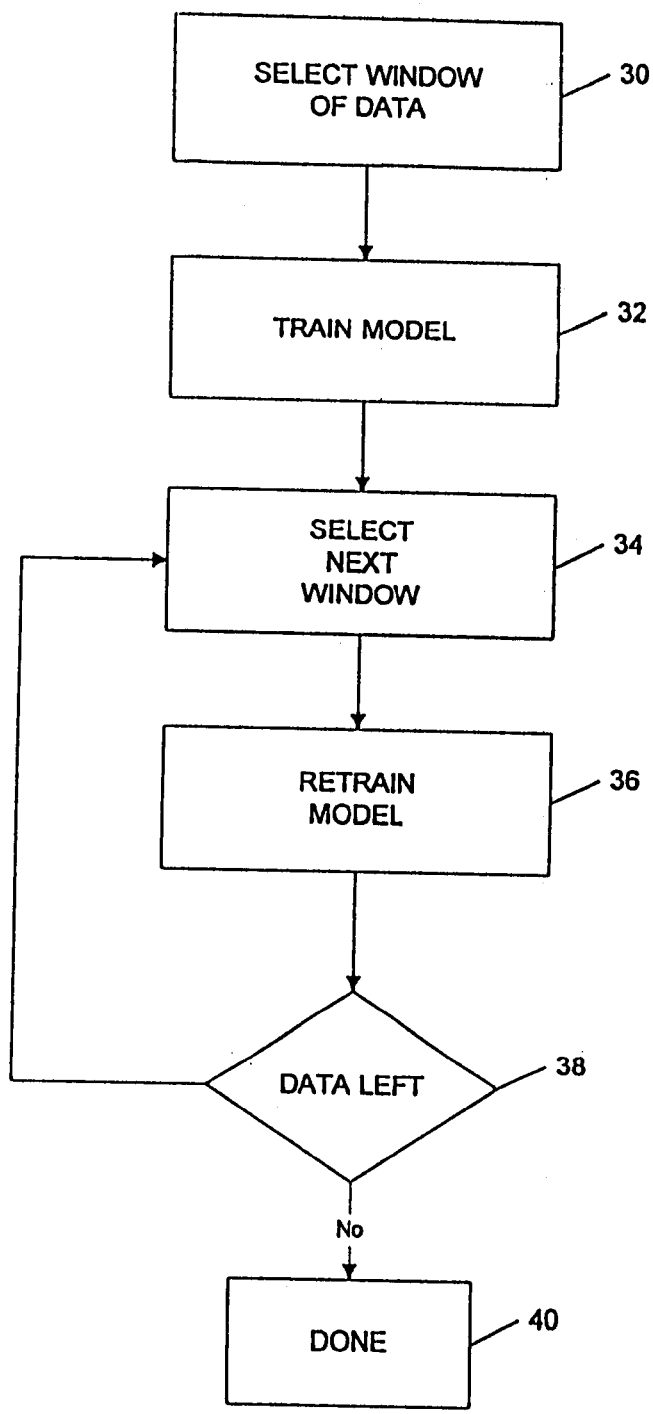
FIG. 2 is a flow chart describing a general process for performing windowed training of a model using a large data set.

Referring now to FIG. 2, a flow chart describing how windowed training generally is performed in one embodiment will now be described. The process described in FIG. 2 assumes that the model type and the input and output fields of data in the initial data set already are defined and initialized. The first window of data 14 (FIG. 1) of the large data set 18 (FIG. 1) is selected in step 30. The initial model is trained in step 32 using the selected first window of data. After training using the first window of data is complete, a next window of data from the large data set is selected in step 34. The trained model 20 (FIG. 1) is then retrained in step 36 with the next window of data. If any data is left in the large data set, as determined in step 38, the process of steps 34, 36 and 38 is repeated. Otherwise, the training process is complete (step 40).

In the kinds of applications in which this process may be used, the large data set typically includes on the order of about millions of records, which often may include several terabytes of data. The large data set may be a stream of data that is received in order by the windowing module 16 (FIG. 1) once, or may be a data file, may be a table in a database, or may be a data set in a system such as the ORCHESTRATE parallel operating environment from Torrent Systems, Inc. of Cambridge, Mass. The first window of data output by the windowing module has a reasonably broad sample of the large data set. The user may perform a random sample and place the random sample at the beginning of the input large data set, or the large data set may be intentionally shuffled. In most conditions, the large data set often is sorted n a manner that has little correlation with the relevance of the data to the model to be created. For example, data records of individuals in which the names are alphabetized should provide a sufficiently random distribution of data records in the first window of data.

The use of the windowing module 16 and the operation of the system as described in FIG. 2, breaks the training of a model into phases based on segments of the input data stream. There are several ways in which a window of data may be selected, depending on how the input of the large data set into the windowing module is coordinated and how the transfer of the window of data to the training or retraining modules is coordinated. In one embodiment, the large data set 18 may be accessed one record at a time, for example by using a pointer or by receiving a stream of training vectors. Similarly, the training and retraining modules 12 and 24 may receive individual training vectors as they are pushed into a training data set. A set of training vectors also may be received by and transferred from the windowing module 16.

Figure 3:
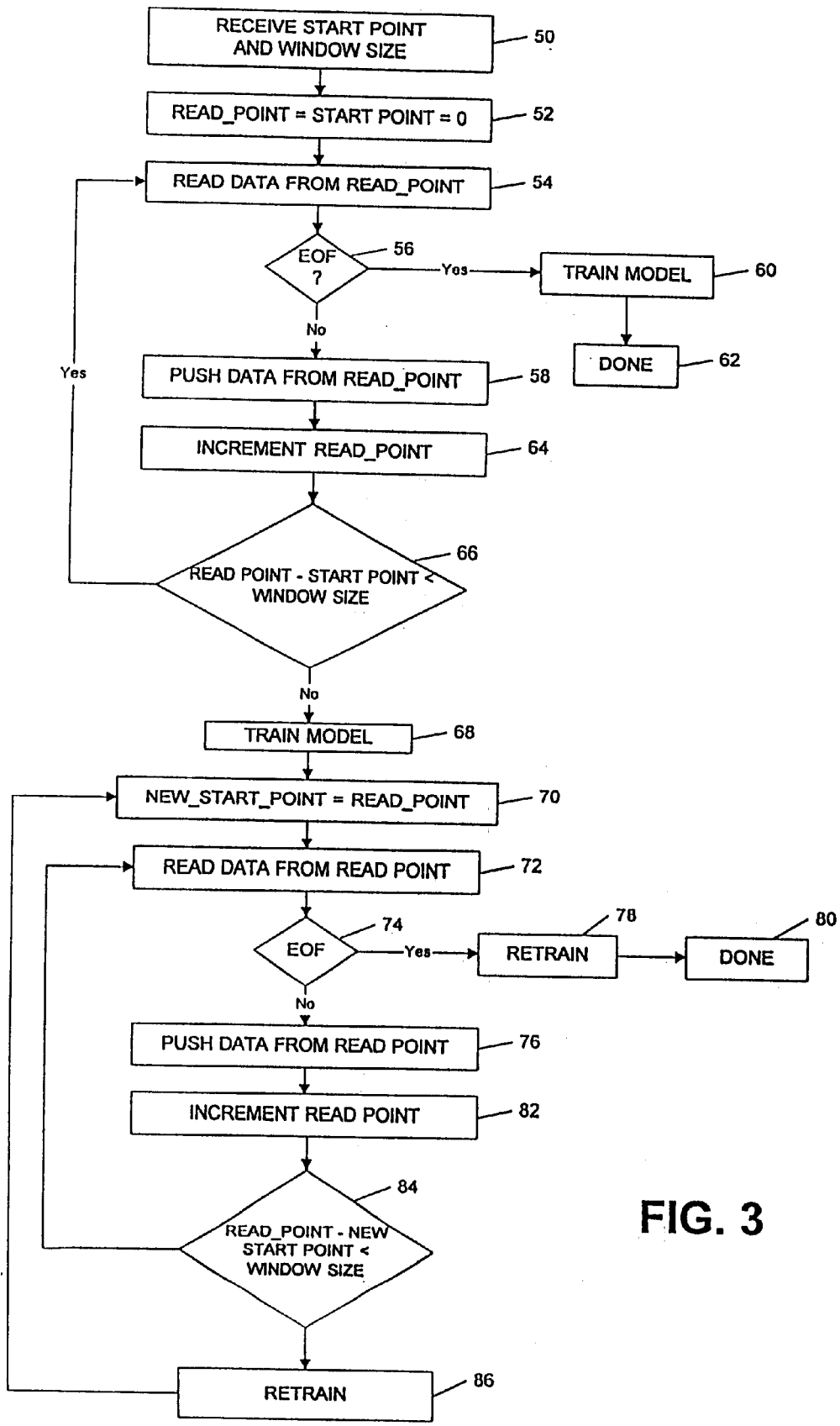
FIG. 3 is a more detailed flow chart of one embodiment of the process of FIG. 2.

FIG. 3 is a flow chart describing how the window training module 16 operates in one embodiment. In this embodiment, the large data set may be read using a read pointer. In step 50, the module receives a start point in the large data set and a window size. A read point is set to the start point in step 52. The start point for example may be zero. The training vector from the read point is read from the large data set in step 54. If the end of the large data set is reached, as determined in step 56 the model is trained in step 60 and this process is complete as indicated at 62. Otherwise, the data read is pushed into the training data set for use by the initial model training module 12 in step 58. The read point is incremented in step 64. As long as the difference between the read point and the start point is less than the window size, as determined in step 66, processing returns to step 54.

After the window size has been reached, the model is trained in step 68 using the initial model training module 12. After initial training is performed, a new start point is set to the current read point in step 70. Data from the current read point is read in step 72. The end of file has been reached as determined in step 74, the model is retrained in step 78 and the process is complete as indicated at step 80. Otherwise, the data read is pushed into the training data step in said training data set in step 76. The read point then is incremented in step 82. If the difference between the read point and the new start point is less than the window size, as determined in step 84, processing returns to step 72 to obtain the next training vector in the current window. Otherwise, the model is retrained in step 86 and processing returns to step 70 to obtain the next window of data.

In FIG. 3, it is assumed that a read pointer is used to access the large data set. In some embodiments, the data is simply received as a data stream and is not accessed using a read pointer or other index into the training data, such as a list or array. In such an embodiment, the read point value, such as incremented at step 64, is maintained as a counter which is cleared whenever the counter reaches the window size in step 66. The value of a start point may be omitted in this embodiment. The read pointer also is reset as a counter in step 70. It is also possible to use a separate "jump" value which is added to the start point value every time a new window is created from the large data set. In this embodiment, in step 70 the jump value would be added to the original start value to obtain a new start value, instead of setting the new start value to the current read point value. This embodiment enables some data in the large data set to be skipped, which is particularly useful for debugging.

Figure 4:
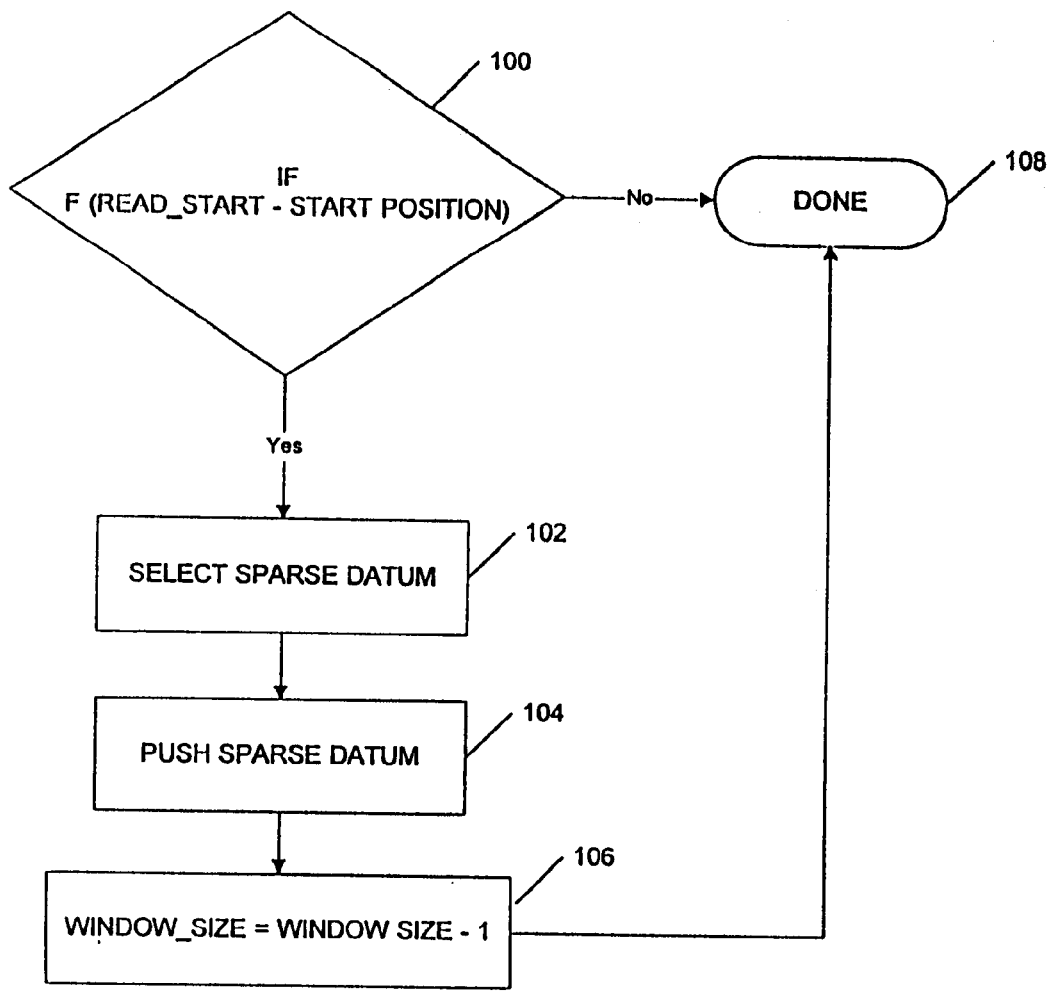
FIG. 4 is a flow chart describing how predetermined sparse conditions may be re-introduced into a training data set during training.

It is also possible to add training vectors corresponding to sparse conditions into a training data set to ensure that the sparse conditions are represented in each training data set output by the windowing module. In one embodiment, the addition of training vectors representing sparse conditions involves an additional step in each of the loops of FIG. 3 to periodically add a vector representative of the sparse condition. Such an additional step is described in more detail with the flow chart of FIG. 4. First, the periodicity of the injection of a training vector for a sparse condition generally may be defined by a function of the read point value such as shown at step 100. For example, if a function of the current read position is not true, nothing is done. If the function is true, a training vector for a sparse condition is selected in step 102, the training vector is pushed into the training set in step 104 and the window size is decremented in step 106. After step 106, processing is returned to the loops shown in FIG. 3. Alternatively, all of the data representative of sparse conditions may be pushed at either the beginning or the end of each training data set.

Having now described the operation of the windowing module 16, the operation of the initial model training module and model retraining module will now be described.

There are several kinds of models that may be trained using windows of data from a large data set, such as described above. Example models are probabilistic radial functions (including probabilistic neural networks, generalized regression neural networks and Gaussian radial basis functions), decision trees (including K-D trees and neural trees), networks, Kohonen networks and other associative algorithms. The models should have properties of memory to retain the effects of training with previous training data sets so that training performed using one window of data is not lost by training performed using subsequent windows of data. In other words, when retrained using additional windows of data, the retrained model represents training performed using all of the windows of data. In general, neural networks and Kohonen networks may be used without modification. Models such as probabilistic neural networks, generalized regression networks, Gaussian radial basis functions, and decision trees such as K-D trees and neural trees may be modified, for example, by using clustering.

Clustering is described, for example, in *Advanced Methods in Neural Computing* by Philip Wasserman, Van Nostrand Reinhold, 1993, which is hereby incorporated by reference. See page 164 of that reference. Using clustering, a cluster of training vectors may be replaced by a single representative vector, which reduces the number of vectors in the training set. Clustering also provides properties of memory because cluster definitions are maintained from the initially trained model through retraining with additional windows of data.

In one embodiment, given a set of training vectors, the first training vector becomes the center of the first cluster. Each training vector is considered in turn. If the distance from the training vector to the center of the nearest cluster is less than or equal to a radius r, it is assigned to that cluster; if this distance is greater than r, the training vector becomes the first member of a new cluster. This procedure performs clustering in a noniterative fashion, in one pass through the training set. An iterative method also may provide good results. A desired number of cluster centers may be selected or may be defined by vectors in the training set. given an input vector $X_k$ from the training set, the cluster center $u_i$ that is closest is selected. For a model that perfroms estimation, the position of this center $u_i$ is adjusted by: $u_i(n+1)=u_i(n)+n*(x_k-u_i)$. For a model that performs classification, if a vector in one cluster is too close to another cluster, the other cluster center is adjusted by $u_i(n+1)=u_i(n)-n*(x_k-u_i)$. These steps are repeated for each input vectors, gradually reducing n, until changes in $u_i$ are negligible.

Figure 5:
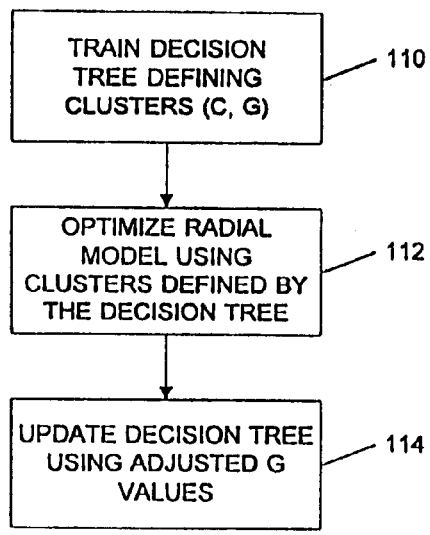
FIG. 5 is a flow chart describing how radial models may be trained.
Figure 6:
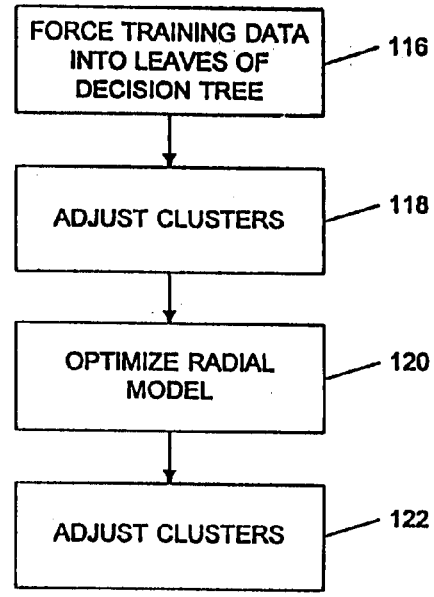
FIG. 6 is a flow chart describing how radial models are retrained.

Training and retraining of radial models will now be described in connection with FIGS. 5 and 6. A decision tree defines clusters which represent the Gaussian function typically used in either a probabilistic neural network or a radial basis function. Each cluster is defined by a center point C and a radius a. Accordingly, using the first window of data, a decision tree is trained to define the clusters in step 110. The radial model defined by the cluster definitions from the decision tree then is optimized in step 112. The decision tree then is updated using the adjusted radius ($\sigma$) values in step 114. Upon retraining, the training data is forced into the leaves of the decision tree in step 116. The clusters defining the leaves of the decision tree then are adjusted in step 118. The radial model defined by cluster definitions from the decision tree then is optimized in step 120. The decision tree then is adjusted by adjusting the clusters defining the leaves of the decision tree in step 122 according to the optimized radial function.

Figure 7:
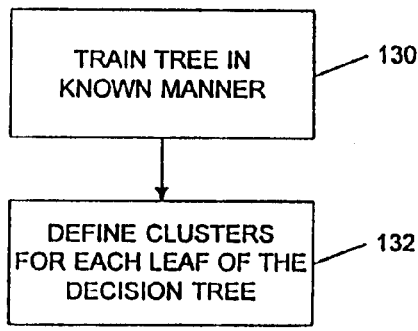
FIG. 7 is a flow chart describing how decision tree models may be trained.
Figure 8:
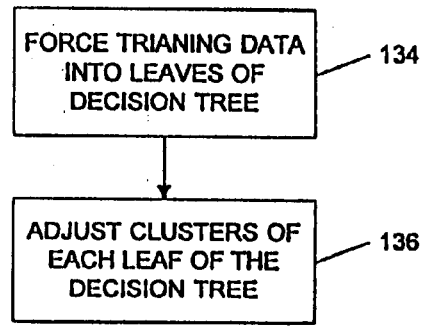
FIG. 8 is a flow chart describing how decision tree models may be retrained.

For decision tree models, the initial tree is trained in the known manner as indicated at step 130 in FIG. 7. Clusters are defined for each leaf of the decision tree in step 132. In step 134, during retraining, the training data is forced into the leaves of the decision tree in step 134. The clusters of each leaf of the decision tree then are adjusted in step 136. In FIGS. 7 and 8, definition and adjustment of the clusters in each leaf of the decision tree may involve creating new cluster definitions.

Figure 9:
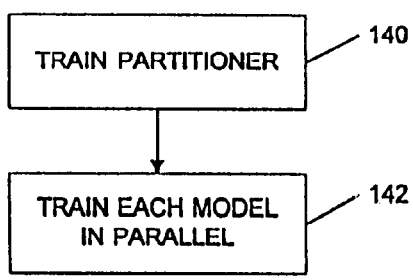
FIG. 9 is a flow chart describing how parallel models with a data partitioner may be trained.

For training with parallel models, such as described in U.S. patent application Ser. No. 08/624,844, filed Mar. 25, 1996, entitled "SYSTEMS FOR ANALYZING AND COMPUTING DATA ITEMS," by Anthony Passera, John R. Thorp, Michael J. Beckerle and Edward S. A. Zyszkowski, as shown in FIG. 9, the initial model training involves training the partitioner first in step 140. Each model then is trained in parallel by forcing the data through the partitioner in step 142. During retraining, the partitioner remains unchanged and each model that is being trained in parallel is trained in a fashion depending on the type of model. For example, neural networks and Kohonen networks are trained as a standard model. The radial functions and decision tree models are trained using clustering in the manner described above.

A computer system for implementing the system shown above as a computer program typically includes a main unit connected to both an output device which displays information to a user and an input device which receives input from a user. The main unit generally includes a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, and data input devices such as sensors. It should be understood the invention is not limited to the particular input or output devices used in combination with the computer system or to those described herein.

The computer system may be a general purpose computer system which is programmable using a computer programming language, such as "C++," JAVA or other language, such as a scripting language or even assembly language. The computer system may also be specially programmed, special purpose hardware. In a general purpose computer system, the processor is typically a commercially available processor, of which the series x86 and Pentium processors, available from Intel, and similar devices from AMD and Cyrix, the 680X0 series microprocessors available from Motorola, the PowerPC microprocessor from IBM and the Alpha-series processors from Digital Equipment Corporation, are examples. Many other processors are available. Such a microprocessor executes a program called an operating system, of which WindowsNT, Linux, UNIX, DOS, VMS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system may be a multiprocessor computer system or may include multiple computers connected over a computer network. It should be understood that each module may be separate modules of a computer program, or may be separate computer programs. Such modules may be operable on separate computers or processors and may be executed in parallel or serially.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for training an analytical model using a training data set having a size greater than a size of memory available in a computer for a training data set for training the analytical model, comprising:

logically dividing the training data set into a plurality of subsets, each having a size at most equal the size of memory available in the computer for a training data set;

selecting a first subset of the data set;

storing the first subset in memory available in the computer for a training data set;

training the analytical model using the first subset as the training data set;

selecting at least one additional subset of the data set and storing the at least one additional subset in the memory available in the computer for a training data set;

retraining the trained analytical model using the at least one additional subset as the training data set, such that the retrained analytical model represents training performed using the first subset and the at least one additional subset.

2. The computer-implemented method of claim 1, wherein acts of selecting at least one additional subset and storing the at least one additional subset in memory available for a training data set, and retraining the trained analytical model using the at least one additional subset as the training data set, are performed until a terminating condition is reached.

3. The computer-implemented method of claim 2, wherein the terminating condition is a lack of additional subsets of the training data set.

4. The computer-implemented method of claim 2, wherein the terminating condition is reached when a desired convergence of the model is achieved.

5. The computer-implemented method of claim 1, wherein the training data set contains data points which represent sparse conditions, and wherein the at least one additional subset of the training data set is comprised of the data points representing the sparse conditions of the training data set.

6. The computer-implemented method of claim 1, wherein the analytical model is a radial model adjusted to have properties of memory to retain effects of training with previous subsets of the training data set when training with a new subset of the training data set through a computer-implemented method comprising:

training the radial model;

updating a decision tree with adjusted radius values;

upon retraining, forcing training data from a subset of the training data set into leaves of the decision tree;

adjusting clusters defining the leaves of the decision tree;

optimizing the radial model defined by clusters from the decision tree; and adjusting the decision tree by adjusting the clusters defining the leaves of the decision tree according to an optimized radial function.

7. The computer-implemented method of claim 1, wherein the analytical model is a decision tree model adjusted to have properties of memory to retain effects of training with previous subsets of the training data set when training with a new subset of the training data set through a computer-implemented method comprising:

training the initial decision tree;

defining clusters for each leaf of the decision tree;

upon retraining, forcing training data from a subset of the training data set into leaves of the decision tree; and adjusting clusters of each leaf of the decision tree.

8. The computer-implemented method of claim 7, wherein adjusting the clusters of each leaf of the decision tree comprises creating new cluster definitions.

9. A computer system, for training an analytical model using a data set having a size greater than a size of memory available in a computer for a training data set for training the analytical model comprising:

means for logically dividing the training data set into a plurality of subsets, each having a size at most equal the size of the memory available in the computer for a training data set;

means for selecting a first subset of the data set;

means for storing the first subset in the memory available in the computer for a training data set;

means for training the analytical model using the first subset as the training data set;

means for selecting at least one additional subset of the data set and storing the at least one additional subset in the memory available in the computer for a training data set;

means for retraining the trained analytical model using the at least one additional subset as the training data set, such that the retrained analytical model represents training performed using the first subset and the at least one additional subset.

10. The computer system of claim 9, further comprising means for repeating operation of the means for selecting at least one additional subset, and storing the at least one additional subset in memory available for a training data set, and the means for retraining the trained analytical model using the at least one additional subset as the training data set, until a terminating condition is reached.

11. The computer system of claim 10, wherein the terminating condition is a lack of additional subsets of the training data set.

12. The computer system of claim 10, wherein the terminating condition is reached when a desired convergence of the model is achieved.

13. The computer system of claim 9, wherein the training data set contains data points which represent sparse conditions, and wherein the at least one additional subset of the training data set is comprised of the data points representing the sparse conditions of the training data set.

14. The computer system of claim 9, wherein the analytical model is a radial model adjusted to have the properties of memory to retain effects of training with previous subsets of the training data set when training with a new subset of the training data set, wherein the system comprises:

means for training the radial model;

means for updating a decision tree with adjusted radius values;

means for forcing training data of the subset of the training data set into leaves of the decision tree upon retraining;

means for adjusting clusters defining the leaves of the decision tree;

means for optimizing the radial model defined by clusters from the decision tree; and means for adjusting the decision tree by adjusting the clusters defining the leaves of the decision tree according to an optimized radial function.

15. The computer system of claim 9, wherein the analytical model is a decision tree model adjusted to have properties of memory to retain effects of training with previous subsets of the training data set when training with a new subset of the training data set, wherein the computer system comprises:

means for training an initial decision tree;

means for defining clusters for each leaf of the decision tree;

means for forcing training data of the subset of the training data set into leaves of the decision tree upon retraining; and means for adjusting clusters of each leaf of the decision tree.

16. The computer system of claim 15, wherein the means for adjusting the clusters of each leaf of the decision tree comprises means for creating new cluster definitions.

* * * * *